(12) United States Patent
Liu et al.

(10) Patent No.: US 7,018,082 B2
(45) Date of Patent: Mar. 28, 2006

(54) LIGHT BULB ASSEMBLY WITH REDUCED TOLERANCE

(75) Inventors: Chia-Yu Liu, Taoyuan (TW); Li-Kuan Wong, Keelung (TW)

(73) Assignee: Benq Corporation, Taoyuan (TW)

( * ) Notice: Subject to any disclaimer, the term of this patent is extended or adjusted under 35 U.S.C. 154(b) by 378 days.

(21) Appl. No.: 10/322,258

(22) Filed: Dec. 17, 2002

(65) Prior Publication Data

US 2003/0124947 A1    Jul. 3, 2003

(30) Foreign Application Priority Data

Dec. 31, 2001 (TW) ............................ 90224332 U

(51) Int. Cl.
*B60Q 1/00* (2006.01)

(52) U.S. Cl. .................. 362/548; 362/362; 362/382

(58) Field of Classification Search ................ 362/362, 362/382, 548
See application file for complete search history.

(56) References Cited

U.S. PATENT DOCUMENTS 3,633,024 A * 1/1972 Hankins ..................... 362/362
4,833,579 A * 5/1989 Skegin ...................... 362/362
5,497,298 A * 3/1996 Luallin et al. ............. 362/548
6,461,025 B1 * 10/2002 Payne ........................ 362/374

FOREIGN PATENT DOCUMENTS

| JP | 11-052489 | 2/1999 |
| JP | 2000-241880 | 9/2000 |
| JP | 2001-249402 | 9/2001 |

* cited by examiner

*Primary Examiner*—John Anthony Ward
*Assistant Examiner*—Jacob Y. Choi
(74) *Attorney, Agent, or Firm*—Ladas & Parry LLP

(57) ABSTRACT

A light bulb assembly with reduced tolerance for engaging a light bulb to a light engine. The light bulb has a first positioning portion. The light bulb assembly has a light machine and a light bulb frame. The light machine has a second positioning portion and an engaging portion for fixing the light bulb in a determined position when the first positioning portion of the light bulb abuts the second positioning portion. The light bulb frame is relatively fixed to the light machine for supporting the light bulb; the light bulb frame has a leaning portion for leaning on the first positioning portion of the light bulb, and an elastic pressure portion for applying three-dimensional pressure on the light bulb for moving toward the determined position.

6 Claims, 6 Drawing Sheets

LIGHT BULB ASSEMBLY WITH REDUCED TOLERANCE

BACKGROUND OF THE INVENTION

1. Field of the Invention

The present invention relates to a light bulb assembly, and particularly to a light bulb assembly for a projector, in which the light bulb assembly has a relatively reduced tolerance.

2. Description of the Related Art

In a conference meeting or a lecture occasion, the lecturer may be need to display figures or diagrams of the subject matter to assist the audience in comprehending. In this case, a projector is generally used to display the subject matter by projecting the slides of the subject matter on a screen.

A light engine is a major component in the construction of the projector. The light engine is composed of numerous elements and requires precision, which induces strict limitations of assembly tolerance, so as to prevent significantly accumulated tolerance generated in assembly.

Generally, the conventional light engine in a projector has a light bulb assembly, which is composed of a light machine, a light bulb frame, and a light bulb. The light bulb frame and the light machine are generally fixed on a base, and the light bulb is installed to the light bulb frame in order to be engaged with the light machine.

However, in the conventional light engine, the light bulb is engaged with the light machine with an accumulated tolerance of three independent tolerances, which includes a first tolerance generated by fixing the light bulb frame on the base, a second tolerance generated by fixing the light machine on the base, and a third tolerance generated by installing the light bulb to the light bulb frame. In this case, even though each independent tolerance may be kept at a preferable value, the accumulated tolerance may surpass a desired precision level; that is, the light bulb may not be well engaged with the light machine even if each of the components of the light engine is precisely installed. Thus, it is obvious that inconsistency on the quality of the light bulb assembly can occur, which further promotes inconsistent quality of the product of light engines and projectors, due to the significant accumulated tolerance.

SUMMARY OF THE INVENTION

In view of this, the object of the present invention is to disclose a light bulb assembly, in which the light bulb is supported by an elastic structure disposed on the light bulb frame, so that only one independent tolerance is generated when the light bulb is engaged with the light machine. Thus, a precise light bulb assembly may be easily achieved, which brings consistent quality to the product of light engines and projectors.

The present invention discloses a light bulb assembly for engaging a light bulb, which has a first positioning portion, to a light engine. The light bulb assembly comprises a light machine and a light bulb frame. The light machine has a second positioning portion and an engaging portion for fixing the light bulb in a determined position when the first positioning portion of the light bulb abuts the second positioning portion. The light bulb frame is relatively fixed to the light machine for supporting the light bulb; the light bulb frame has a leaning portion for leaning on the first positioning portion of the light bulb, and an elastic pressure portion for applying three-dimensional pressure on the light bulb toward the determined position.

The light bulb assembly of the present invention may preferably have a base for fixing the light machine and the light bulb frame.

In the light bulb assembly of the present invention, the first positioning portion of the light bulb may have a first positioning surface, a second positioning surface and a third positioning surface, and the first, second and third positioning surfaces are substantially orthogonal. Further, the second positioning portion of the light machine may have a first rib for abutting the first and third positioning surfaces of the light bulb, and a second rib for abutting the second and third positioning surfaces of the light bulb. Further, the elastic pressure portion may have a plurality of leaf springs.

The light bulb assembly disclosed in the present invention may be applied in a front projector or a rear projector.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

An embodiment of the light bulb assembly of the present invention is described hereinafter in detail with reference to the figures.

Figure 1B:
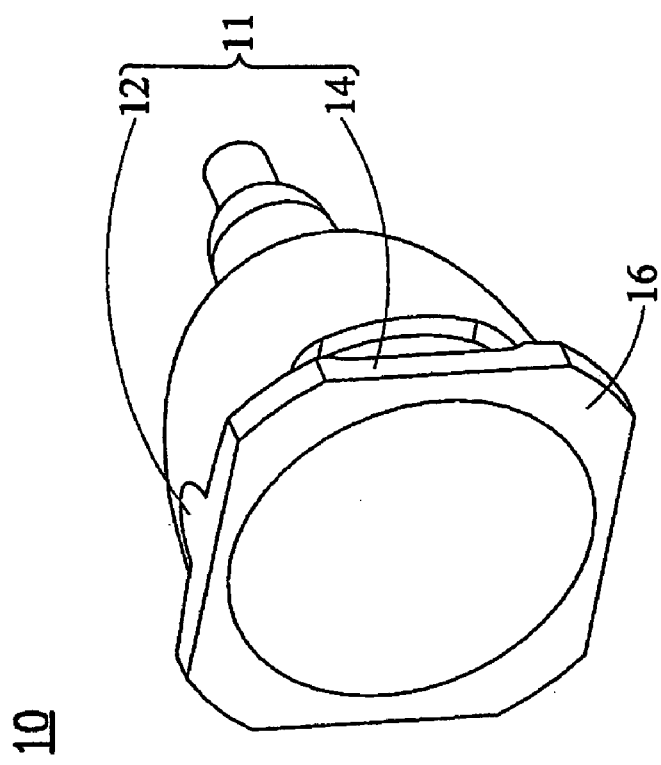
FIG. 1*a* and FIG. 1*b* are perspective views showing the light bulb in an embodiment of the light bulb assembly of the present invention.
Figure 1A:
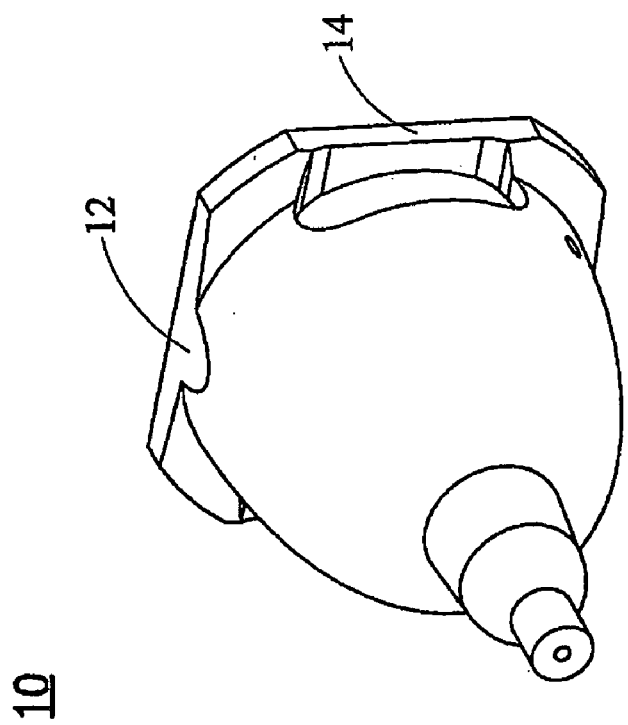

The light bulb 10 used in this embodiment is shown in FIG. 1*a* and FIG. 1*b*. The light bulb 10 has a portion for engaging the light bulb frame, and a first positioning portion 11. In this embodiment, the first positioning portion 11 is composed of a plurality of orthogonal surfaces, which include a first positioning surface (surface X) 12, a second positioning surface (surface Y) 14, and a third positioning surface (surface Z) 16 for positioning the light bulb relatively to the light bulb frame.

Figure 2A:
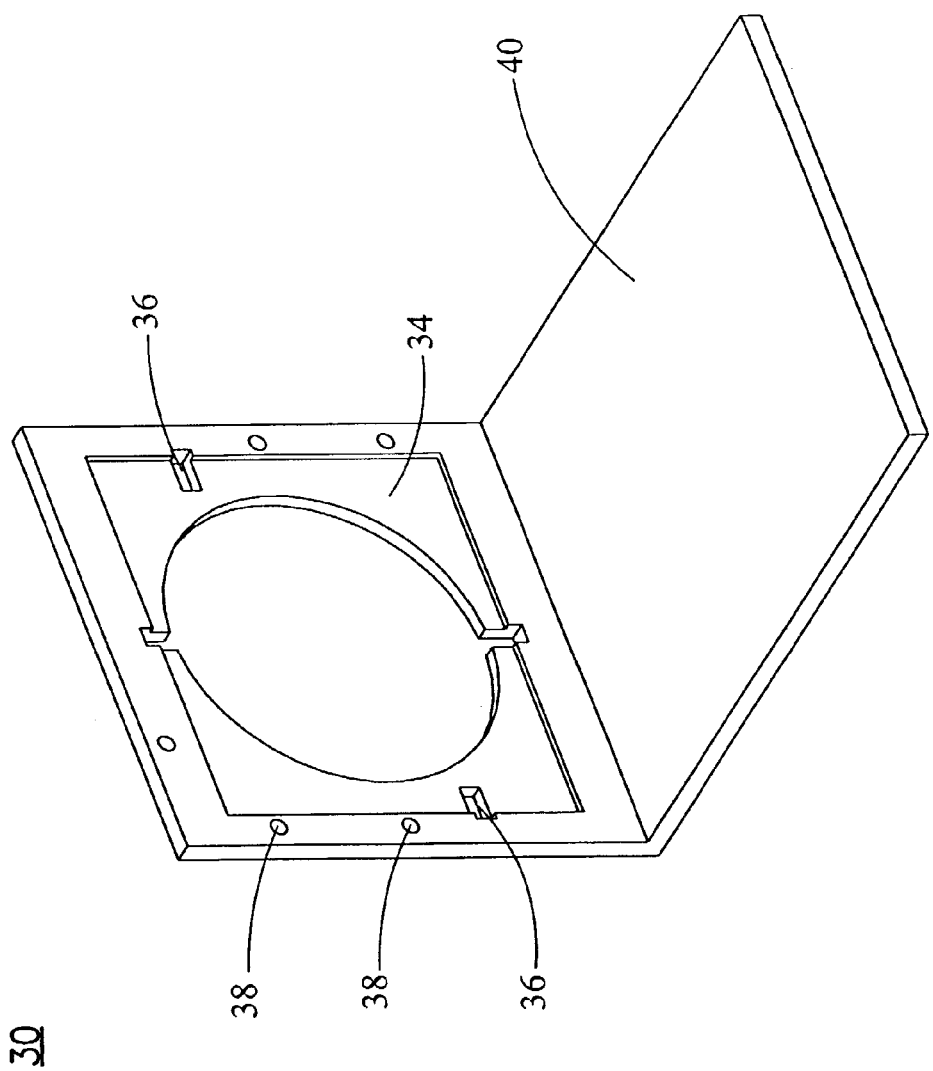
FIG. 2*a* is a perspective view showing the light bulb frame in the above-mentioned embodiment of the present invention.
Figure 2B:
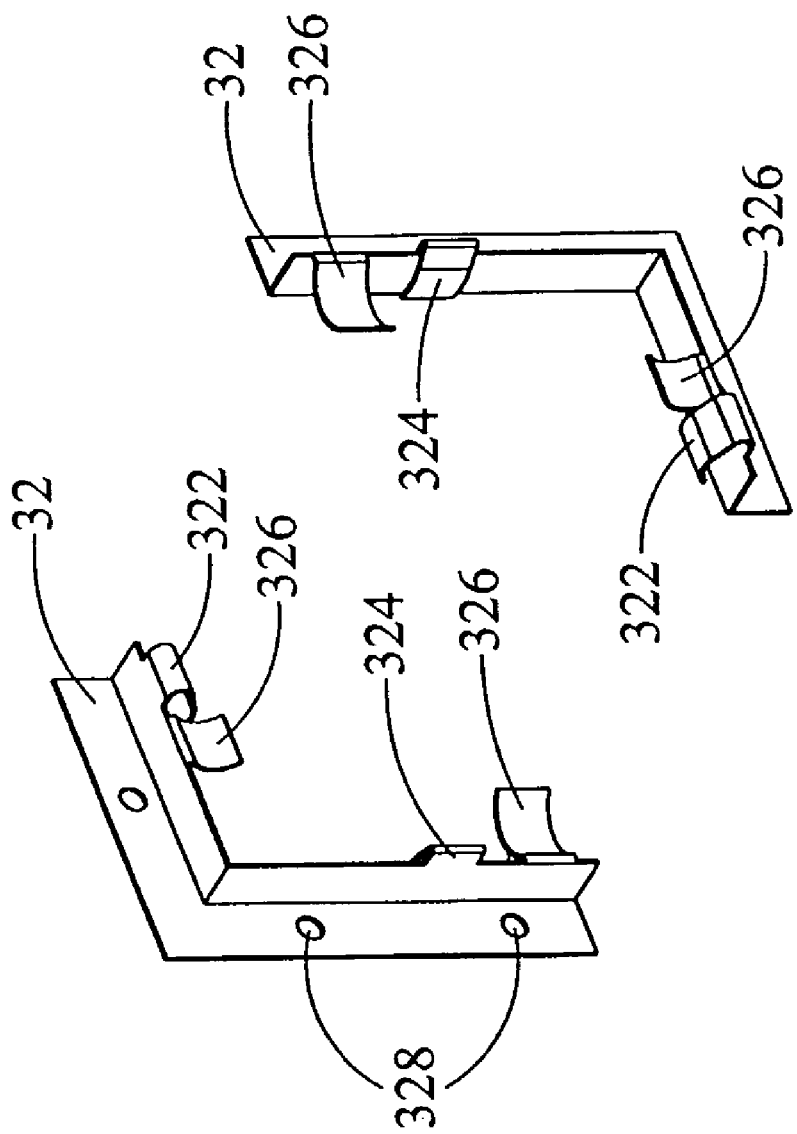
FIG. 2*b* is a perspective view showing the elastic pressure portion in the above-mentioned embodiment of the present invention.

The light bulb frame 30 in this embodiment is shown in FIG. 2*a* and FIG. 2*b*. The light bulb frame 30 has an L-shaped structure as shown in FIG. 2*a*, and a set of leaf springs 32 as shown in FIG. 2*b*, which serves as an elastic pressure portion. The light bulb frame 30 supports the light bulb 10 while being relatively fixed to the light machine 20. The light bulb frame 30 comprises a leaning portion 34 and a base 40. The leaning portion 34 for leaning on the third positioning surface 16 of the first positioning portion of the light bulb 10 and a plurality of rib holes 36 are provided on the L-shaped structure of the light bulb frame 30. Further, each of the leaf springs 32 has an X elastic portion 322, a Y elastic portion 324, and two Z elastic portions 326 for elastically supporting and applying three-dimensional pressure on the light bulb 10, so that the light bulb 10 is urged to move toward a determined position. The leaf springs 32 may be riveted or screwed to the L-shaped structure of the light bulb frame 30 through the fixing holes 328 and the corresponding holes 38 on the L-shaped structure.

Figure 3:
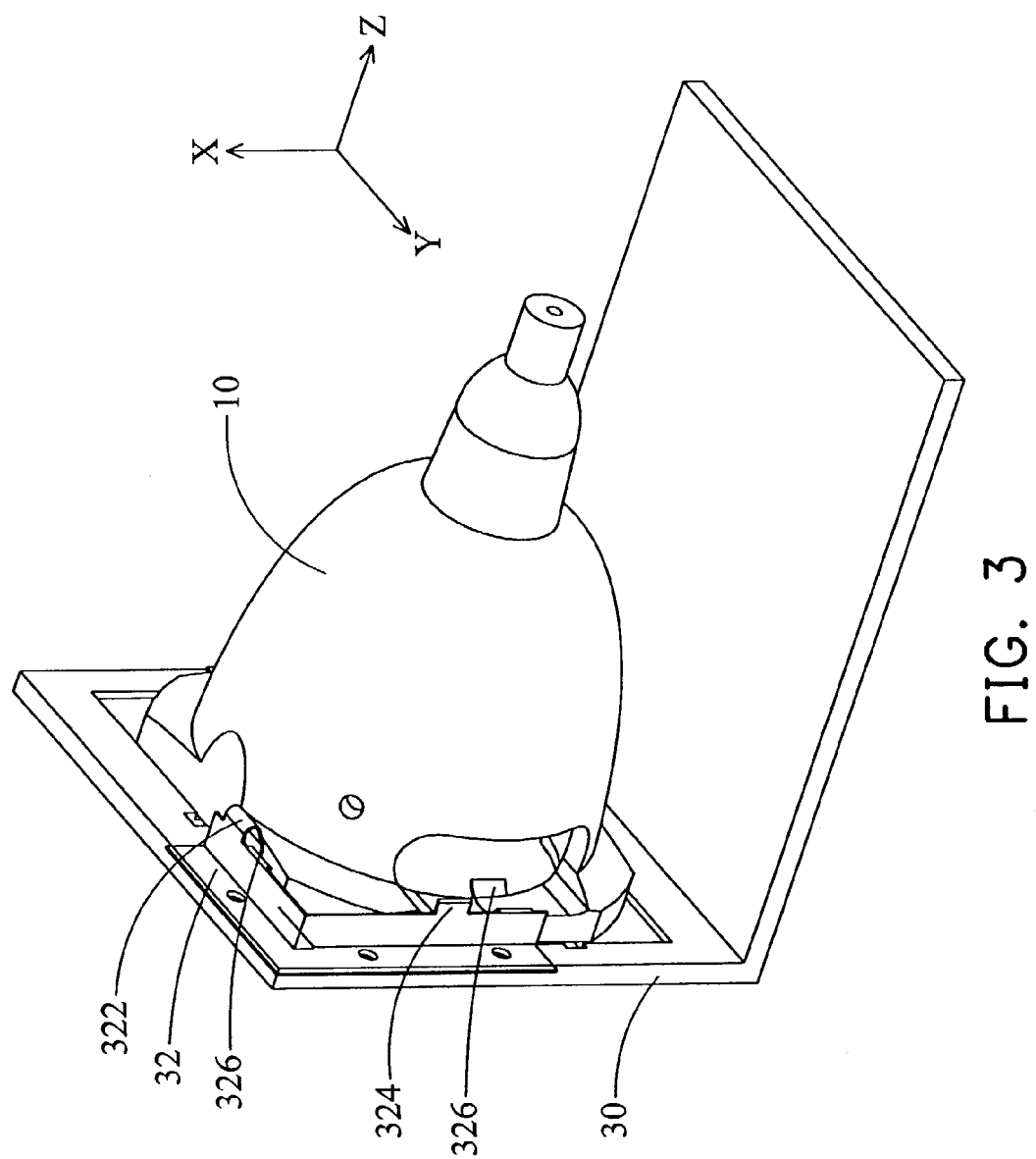
FIG. 3 is a perspective assembled view showing the light bulb engaged with the light bulb frame in the above-mentioned embodiment of the present invention.

FIG. 3 shows the light bulb 10 engaged with the light bulb frame 30 in this embodiment. In FIG. 3, the light bulb 10 is elastically supported by the leaf springs 32, so that the light bulb 10 is three-dimensionally movable, and the tolerance generated between the light bulb 10 and the light bulb frame 30 is thus eliminated.

Figure 4:
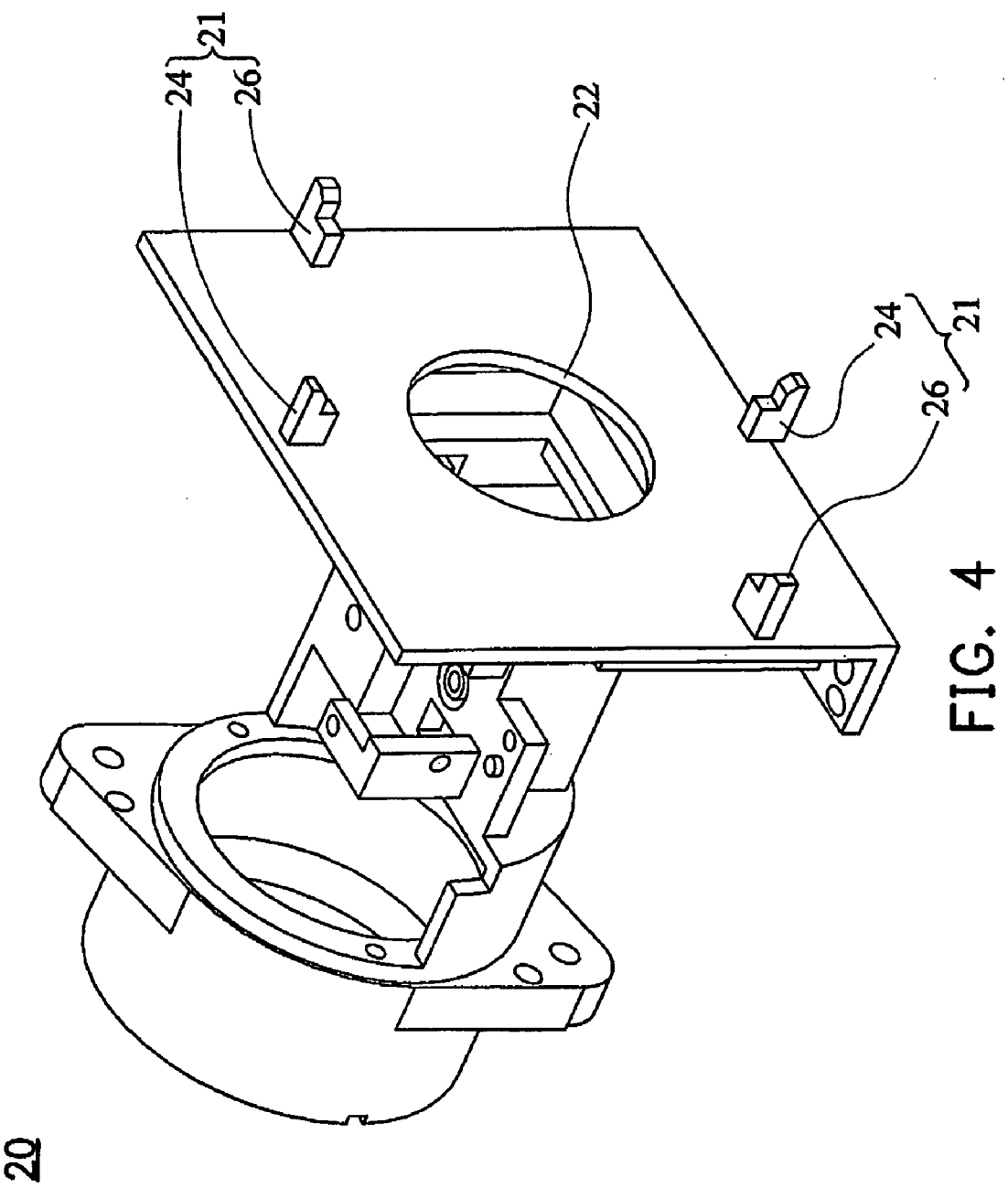
FIG. 4 is a perspective view showing the light machine in the above-mentioned embodiment of the present invention.

Further, the light machine 20 in this embodiment is shown in FIG. 4. The light machine 20 has a second positioning portion 21 and an engaging portion 22. In this embodiment, the second positioning portion 21 has a pair of first ribs 24 and a pair of second ribs 26 provided on the engaging portion 22.

Figure 5:
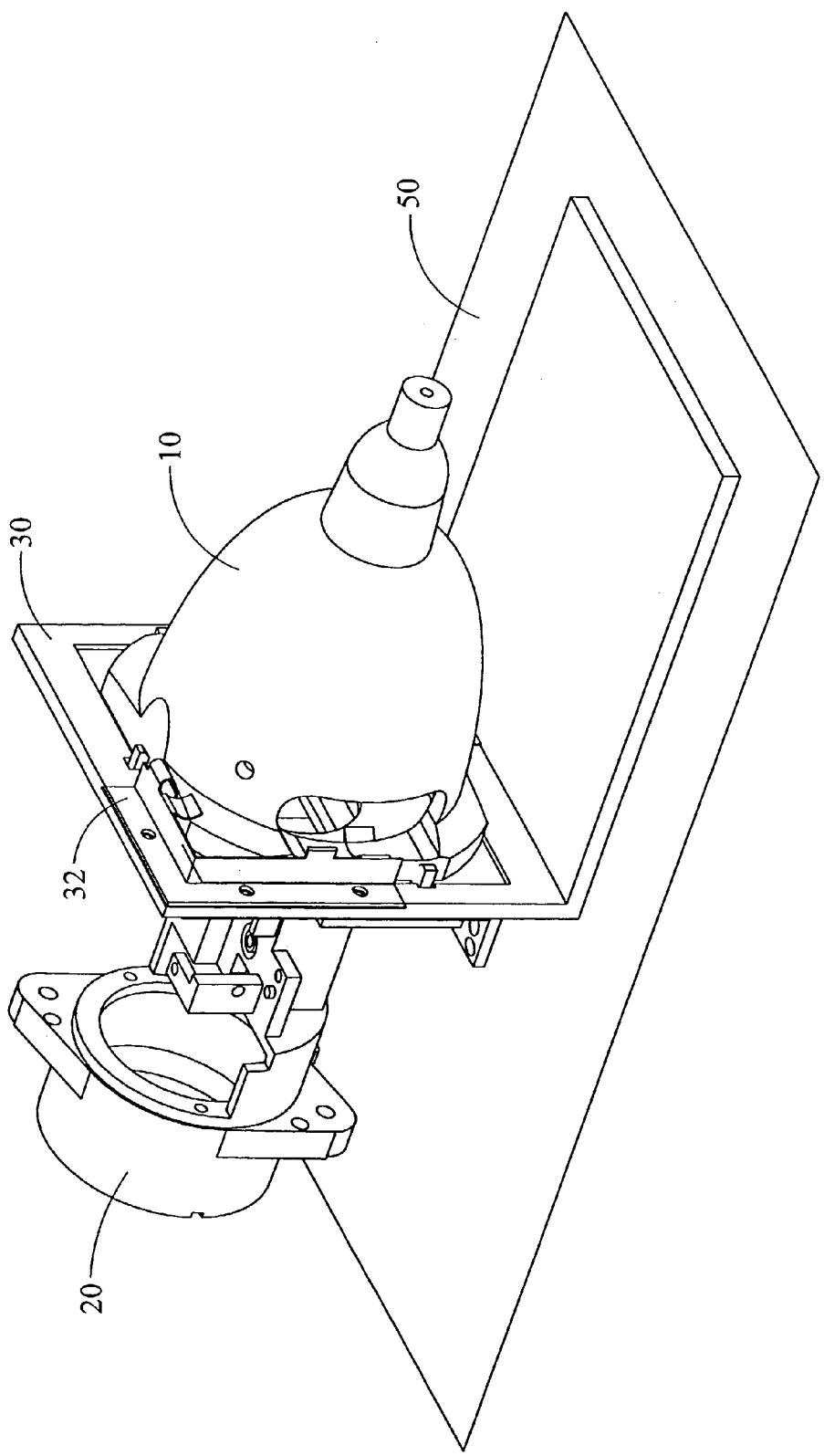
FIG. 5 is a perspective view showing the light bulb assembly in the above-mentioned embodiment of the present invention.

Referring to FIG. 5, the light machine 20 and the light bulb frame 30 are fixed on a base 50 which is a base of a front projector or a rear projector. In assembly of the light machine 20 and the light bulb frame 30 as shown in FIG. 5, the first ribs 24 of the light machine 20 pass through the rib holes 36 to abut the first and third positioning surfaces 12, 16 of the light bulb 10, and the second ribs 26 of the light machine 20 pass through the rib holes 36 to abut the second and third positioning surfaces 14, 16 of the light bulb 10. Tn this case, the light bulb 10 is fixed in a determined position despite the engagement of the light bulb 10 and the light bulb frame 30. That is, an accumulated tolerance between the light machine 20 and the light bulb frame 30 may exist due to the first and second tolerance in the conventional light bulb assembly; however, since the light bulb 10 is elastically supported by the leaf springs 32 and is three-dimensionally movable, a position adjustment of the light bulb 10 may be achieved by abutting the first and second ribs 24, 26 to the positioning surfaces 12, 14 and 16.

Consequently, the light bulb assembly of the present invention eliminates the conventional accumulated tolerance by the light bulb frame 30 that enables the light bulb 10 to be three-dimensionally movable. Thus, only an independent tolerance exists in fixing the light bulb 10 to the determined position, which can be eliminated by precision of the first and second ribs 24, 26 of the light machine 20 and the positioning surfaces 12, 14 and 16 of the light bulb 10.

Further, the light bulb assembly of the present invention enables consistent quality of the product of light engines and projectors while simplifying the positioning and assembly structure. As a result, it is simple to apply the light bulb assembly of the present invention in any kind of projector, such as a front projector or a rear projector.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A light bulb assembly for engaging a light bulb and a light engine, the light bulb having a first positioning portion comprising a first positioning surface, a second positioning surface substantially orthogonal to the first positioning surface, a third positioning surface substantially orthogonal to the first and second positioning surfaces and a back surface, the light bulb assembly comprising:
   a light bulb frame supporting the light bulb and comprising a leaning portion for leaning on the first positioning portion of the light bulb; and
   an elastic pressure portion disposed on the light bulb frame, the elastic pressure portion comprising a first elastic element applying pressure on the light bulb in a first direction, a second elastic element applying pressure on the light bulb in a second direction, and a third elastic element abutting the back surface to supporting the light bulb in a third direction, whereby the light bulb is supported in the light bulb frame and the third positioning surface abuts the leaning portion, wherein the first direction, the second direction and the third direction are substantially orthogonal to one another.

2. The light bulb assembly according to claim 1, further comprising a base for fixing the light machine and the light bulb frame on a projector.

3. The light bulb assembly according to claim 1, wherein the first, second and third elastic members are leaf springs.

4. The light bulb assembly according to claim 1, wherein the light machine is applied in a front projector.

5. The light bulb assembly according to claim 1, wherein the light machine is applied in a rear projector.

6. A light bulb assembly for engaging a light bulb and a light engine, the light bulb having a first positioning portion, the light bulb assembly comprising:
   a light bulb frame supporting the light bulb and comprising a leaning portion for leaning on the first positioning portion of the light bulb; and
   an elastic pressure portion disposed on the light bulb frame, the elastic pressure portion comprising a first elastic element applying pressure on the light bulb in a first direction, a second elastic element applying pressure on the light bulb in a second direction, and a third elastic element supporting the light bulb in a third direction, whereby the light bulb is supported in the light bulb frame; and
   a light machine having a second positioning portion and an engaging portion for fixing the light bulb in a determined position when the first positioning portion of the light bulb abuts the second positioning portion, wherein the light bulb frame is relatively fixed to the light machine, wherein the second positioning portion of the light machine comprises a first rib for abutting the first and third positioning surfaces of the light bulb; and a second rib for abutting the second and third positioning surfaces of the light bulb.

* * * * *